United States Patent [19]

Blumbergs et al.

[11] 3,821,296

[45] June 28, 1974

[54] METHOD OF PRODUCING THE TRISODIUM SALT OF CARBOXY METHYLOXYSUCCINIC ACID

[75] Inventors: John H. Blumbergs, Highland Park; Joseph H. Finley, Metuchen, both of N.J.

[73] Assignee: FMC Corporation, New York, N.Y.

[22] Filed: Oct. 26, 1972

[21] Appl. No.: 301,161

[52] U.S. Cl. .................................. 260/535 P
[51] Int. Cl. ........................................ C07c 59/22
[58] Field of Search .......................... 260/535 P

[56] References Cited
UNITED STATES PATENTS
3,692,685   9/1972   Lamberti et al. ................ 260/535 P Primary Examiner—Lorraine A. Weinberger
Assistant Examiner—Paul J. Killos

[57] ABSTRACT

In the method of producing the trisodium salt of carboxymethyloxysuccinic acid by reacting in aqueous media maleic acid and glucolic acid under basic conditions in the presence of calcium ions to produce the calcium salt of carboxymethyloxysuccinic acid and reacting the calcium salt with soda ash thereby forming a reaction mixture containing the trisodium salt and calcium carbonate, the improvement of increasing the filterability of the calcium carbonate to facilitate its separation from the reaction mixture comprising forming the trisodium salt of carboxymethyloxysuccinic acid by contacting simultaneously approximately stoichiometric amounts of the calcium salt and soda ash with a heel of preformed reaction mixture.

4 Claims, No Drawings

METHOD OF PRODUCING THE TRISODIUM SALT OF CARBOXY METHYLOXYSUCCINIC ACID

This invention relates to an improvement in the production of the trisodium salt of carboxymethyloxysuccinic acid from maleic and glycolic acid.

Carboxymethyloxysuccinic acid and its alkali metal and quaternary ammonium salts are known chemical entities having utility as biodegradable detergent builders. Detergent compositions containing such builders are described at length in U.S. Pat. No. 3,635,830.

The known method of preparing carboxymethyloxysuccinic acid and its trisodium salt is disclosed in South African Pat. application 70-7910 of May 24, 1971. According to the procedure therein, maleic acid is reacted with glycolic acid under basic conditions in the presence of zinc or calcium ions. An excess of calcium hydroxide (lime) provides the requisite reaction media. Formation of the carboxymethyloxysuccinic acid takes place by a Michaël type addition in accordance with the following scheme

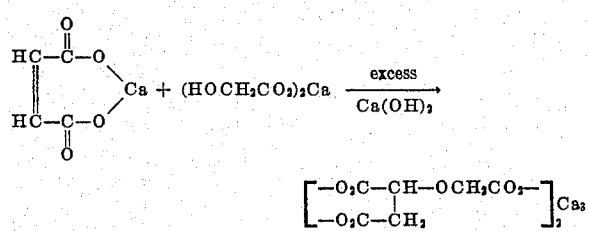

The reaction mixture is treated with aqueous soda ash which precipitates calcium carbonate while forming a solution of the trisodium salt of carboxymethyloxysuccinic acid. After removal of the calcium carbonate, the filtrate is evaporated and the carboxymethyloxysuccinic acid recovered as the solid trisodium salt. Alternately, the reaction mixture can be contacted with an ion exchange resin which converts the calcium salt of carboxymethyloxysuccinic acid to the free acid form which is isolated by evaporation.

The prior process of producing the trisodium salt of carboxymethyloxysuccinic acid is satisfactory when working with small quantities of reactants such as are employed in laboratory preparations. However, when attempts are made to scale up the reaction, difficulties are encountered in isolating the final product. Thus, when soda ash is added to the reaction mixture to form the trisodium salt of carboxymethyloxysuccinic acid, the by-product calcium carbonate precipitates out in such a finely divided form that its removal poses an inordinately vexatious problem; filters become plugged and must be frequently cleaned while centrifuges require operation for long periods to effect settling of the almost colloidal like dispersion. Such procedural difficulties cannot be tolerated on a scale even approaching a commercial undertaking.

Manifestly, the shortcomings associated with the presently known method of producing the trisodium salt of carboxymethyloxysuccinic acid greatly hinders the exploitation of this valuable and useful material.

It has now been discovered that the difficulties attendant the prior production of carboxymethyloxysuccinic acid as the trisodium salt by treating the calcium salt reaction mixture with soda ash can, for all practical purposes, be circumvented by contacting approximately stoichiometric amounts of the calcium salt reaction mixture and soda ash with the heel of a previous reaction mixture whereby the resultant calcium carbonate by-product is formed as a rapid settling coarse precipitate, which is removed from the reaction mixture leaving an aqueous solution of the trisodium salt of carboxymethyloxysuccinic acid.

In carrying out the process of the invention, the trisodium salt of carboxymethyloxysuccinic acid is first prepared in the known manner from maleic and glycolic acids in the presence of excess calcium hydroxide as the basic agent and source of calcium ions and the resulting calcium salt reacted with soda ash. This reaction mixture is then used as a heel in subsequent preparations of the trisodium salt of carboxymethyloxysuccinic acid in order to obtain the calcium carbonate by-product in the form of a course, rapid settling precipitate. This is readily separated from the reaction mixture by centrifugation, filtration or settling, filtration being especially convenient and economical to carrying out. The remaining filtrate is then evaporated leaving a residue of trisodium salt of carboxymethyloxysuccinic acid which can be used in formulating detergent compositions.

It is to be understood that the process herein is also applicable to the continuous production of the trisodium salt of carboxymethyloxysuccinic acid. For instance, a slurry stream of the calcium salt of carboxymethyloxysuccinic acid from the reaction vessel and a stream of soda ash are introduced into a mixing zone thereby continuously forming the trisodium salt of carboxymethyloxysuccinic acid and by-product calcium carbonate. The resulting mixture flows from the mixing zone to a holding tank from whence it is conveyed to a filter to remove calcium carbonate. The filtrate flows to an evaporating station where volatiles are distilled off leaving a residue of the solid trisodium salt of carboxymethyloxysuccinic acid. In the continuous operation of the invention, there is a sufficient residence period in the holding tank and other vessels and supply lines to provide an effective heel for promoting more rapid filtration of by-product calcium carbonate. Thus, the term heel applies to both batch and continuous modes of operating the process of the invention.

Reference is now made to the following nonlimiting examples.

EXAMPLE 1

In a 2-liter, 3 neck, round bottom laboratory flask supplied with a laboratory stirrer, condenser and thermometer, was charged 188.16 g of maleic anhydride (1.92 moles) and 885 ml of distilled water. The mixture was left overnight to dissolve the maleic anhydride and yield maleic acid solution. Then 250.9 g of 70 percent glycolic acid was added, followed by 254.4 g of calcium hydroxide. Temperature was 92°C after Ca(OH)$_2$ was added. Then the flask was immersed in a preheated glycerol bath at 120°C and the reaction mixture was stirred at 100°C for 105 minutes.

A sample of the reaction mixture was then analyzed for unreacted maleic acid by polarographic determination of double bond. The results showed only 0.85 percent of maleic acid present, indicating a conversion of 94 percent theoretical.

To 143 g sample of the reaction mixture was added 33 g of dry soda ash and stirred for 15 minutes at 68°C. This was used as a heel for precipitation of the CaCO$_3$ from the reaction mixture. In this case, both Na$_2$CO$_3$ and reaction mixture was added simultaneously to this heel in about stoichiometric amounts. This was achieved by taking a known amount of reaction mixture and stoichiometric amount of soda ash and charged into the heel continuously, as shown in Table I.

TABLE I

Run A
All amounts are given in grams

| Time | Reaction Mixture | $Na_2CO_3$ | Temperature °C |
|---|---|---|---|
| 11:00 A.M. | 198 | 45 | 61 |
| 11:20 A.M. | 224 | 52 | 61 |
| 11:35 A.M. | 271 | 62.5 | 58 |
| 11:50 A.M. | 264 | 61 | 63 |
| 12:05 P.M. | 191 | 44 | 67 |
| 12:20 P.M. | 201 | 46 | 64 |
| 12:35 P.M. | 55 | 13 | 63 |
| Total charge | 1404 | 323.5 | |

Total time in $CaCO_3$ precipitation was 95 minutes.

Microscopic determination of the particle size of $CaCO_3$ precipitate showed 15 μm to 30 μm range. Filtration rates were determined by using a 150 ml, glass fritted filter with medium size pores and by charging a known amount of the slurry on the filter measuring the time required to separate the $CaCO_3$ particles. Before the next charge, part of the cake was removed, leaving only ½ inch cakes on the filter. The filtration rates are shown in Table II.

TABLE II

| Reaction Mixture grams | ml | Temperature °C | Filtration Time (seconds) | Filtration Rate mil/min | gal/min/ sq. ft. |
|---|---|---|---|---|---|
| 273 | 205 | 65–60 | 265 | 45 | 0.41 |
| 246 | 180 | 60–55 | 404 | 27 | 0.25 |
| 278 | 210 | 60–55 | 522 | 24 | 0.22 |
| 273 | 205 | 60–55 | 520 | 24 | 0.22 |
| 304 | 225 | 60–55 | 645 | 21 | 0.19 |
| 267 | 200 | 60–55 | 546 | 22 | 0.20 |
| 173 | 125 | 60–55 | 340 | 22 | 0.20 |

Total of 1814 g of the slurry was used giving an average filtration rate of 0.19 to 0.22 gallons per minute per square feet filter surface.

Run B

This run was carried out by the same procedure described in Run A except that after the reaction was completed, the $CaCO_3$ precipitation was completed by the prior procedure described in the previously cited South African Pat. application 70-7910. By this procedure all the $Na_2CO_3$ was charged into the reaction mixture at 60°–70°C for a period of 15 minutes. After stirring at 60°C for an additional 30 minutes, microscopic analyses showed $CaCO_3$ particles in the range of 1 μm to 2 μm size and about 5 percent was less than 1 μm size.

Filtration rates were determined by the same procedure as described in Run A. The results are listed in Table III.

TABLE III

| Reaction Mixture grams | ml | Temperature °C | Filtration Time (seconds) | Filtration Rate ml/min | gal/min/ sq. ft. |
|---|---|---|---|---|---|
| 134 | 100 | 60–55 | 1200 | 5 | 0.045 |
| 138 | 105 | 60–55 | filter plug-up | — | — |

In this run a filter plug-up was observed after second charge and the run was discontinued. This procedure is not suitable for a large scale production of the trisodium salt of carboxymethyloxysuccinic acid.

EXAMPLE 2

Run A

The reaction flask in this run was a 3-liter, round bottom jacketed flask, supplied with a laboratory stirrer, condenser and thermometer. In a beaker was charged 200 g of maleic anhydride (2.04 mole) in 500 ml of distilled water. The mixture was stirred at room temperature until all maleic anhydride was dissolved (approximately 30–40 minutes). In the reaction flask was charged 247 g of $Ca(OH)_2$ (Fisher C.P. grade) and 500 ml of water. To the maleic acid solution was added 231 g of 68.5 percent glycolic acid (2.08 mole) and the acid mixture was charged into the reaction flask with good stirring. The temperature rose to 95°C. Low pressure steam was applied in the jacket to maintain a temperature in he reaction flask at 100°–102°C. Samples of the reaction mixture were withdrawn every 15 minutes and were analyzed for pH, maleic and fumaric acid contents. The pH measurement was done at room temperature. The maleic and fumaric acids were determined by polarographic analyses. The results are listed in Table IV.

TABLE IV

| Reaction Time minutes | pH | Maleic Acid % | Fumaric Acid % | % Conversion |
|---|---|---|---|---|
| 0 | 11.40 | 14.03 | 0 | 0 |
| 15 | 11.52 | 5.29 | <0.05 | 61.9 |
| 30 | 11.60 | 3.17 | 0.077 | 76.9 |
| 45 | 11.74 | 2.11 | 0.13 | 84.0 |
| 60 | 12.04 | 1.27 | 0.26 | 89.1 |
| 75 | 12.10 | 0.90 | 0.29 | 91.5 |
| 90 | 12.10 | 0.54 | 0.34 | 93.7 |
| 105 | 12.13 | 0.52 | 0.34 | 93.9 |
| 120 | 12.11 | 0.40 | 0.35 | 94.7 |

After 2 hours, the reaction mixture was cooled to 65°C and was charged into another 3-liter, jacketed round bottom flask, supplied with laboratory stirrer and maintained at 65°C with circulating warm water through the jacket, containing 100 g of $CaCO_3$ slurry from a previous run. The feed rate of the reaction mixture was 27 g per minute. Simultaneously through the third neck was charged dry soda ash with a rate of 6.0 g per minute. Total charging time was 60 minutes and 360 g of soda ash was used. The mixture was then stirred for an additional 30 minutes. A sample analyzed by microscopic method showed $CaCO_3$ particles in the range of 12–15–25 μm size. The $CaCO_3$ particles were then separated from the trisodium salt of carboxymethyloxysuccinic acid solution by centrifugation using International Centrifuge, 12 inch ID drum size and cotton filter cloth. The $CaCO_3$ cake was washed with small amount of distilled water. There were obtained 1720 g of solution, containing 28.8 percent of the trisodium salt of carboxymethyloxysuccinic acid. The centrifugation proceeded without any difficulty.

Run B

This run was carried out in the same way as Run A, except that $CaCO_3$ precipitation was completed by the method described in the South African patent application. After two hours reaction time, the conversion of the maleic acid to the trisodium salt of carboxymethyloxysuccinic acid was found to be 94.2 percent. The reaction mixture was then cooled to 65°C and 370 g of dry soda ash was charged into the reaction flask with good stirring. Charging time was 20 minutes. The slurry was then stirred at 65°C for an additional 30 minutes and the $CaCO_3$ precipitate was found to be in the range of 1-2 μm. The same centrifuge was used as in Run A trying to separate the precipitate, but without success. At start, a large amount of particles went through the cotton filter cloth. Later the small particles stopped the flow completely, leaving mother liquor inside the centrifuge drum.

What is claimed is:

1. In the method of producing the trisodium salt of carboxymethyloxysuccinic acid by reacting in aqueous media maleic acid and glycolic acid under basic conditions in the presence of calcium ions to produce the calcium salt of carboxymethyloxysuccinic acid and reacting the calcium salt with soda ash thereby forming a reaction mixture containing the trisodium salt and calcium carbonate, the improvement of obtaining the calcium carbonate as a readily separable precipitate comprising forming the said trisodium salt by contacting simultaneously, approximately stoichiometric amounts of the calcium salt and soda ash with a heel of preformed reaction mixture.

2. The method according to claim 1 wherein the basic reaction conditions and calcium ions are supplied by calcium hydroxide.

3. The method according to claim 1 wherein the calcium carbonate is separated from the aqueous solution containing the trisodium salt of carboxymethyloxysuccinic acid and the solution evaporated to give the solid trisodium salt.

4. The method according to claim 3 wherein the calcium carbonate is separated by filtration.

* * * * *